W. KNÝ.
SLED.
APPLICATION FILED OCT. 5, 1910.

1,007,361.

Patented Oct. 31, 1911.

2 SHEETS—SHEET 1.

WITNESSES:

INVENTOR:
WILHELM KNÝ
by
Attorney.

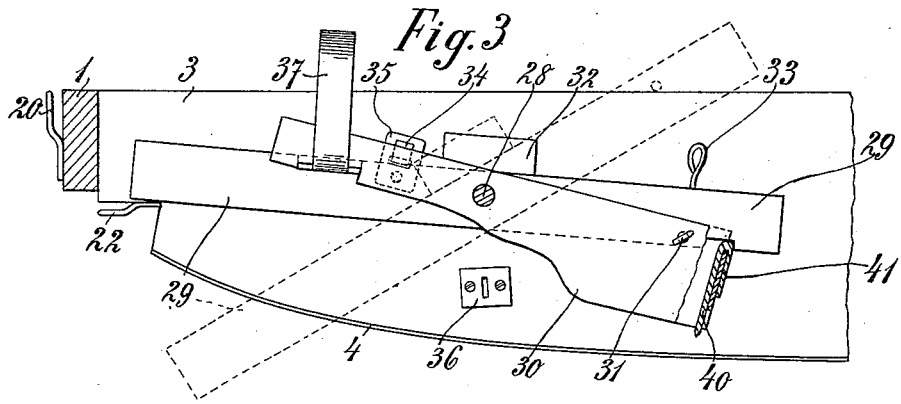

UNITED STATES PATENT OFFICE.

WILHELM KNŸ, OF BODENBACH-ON-THE-ELBE, AUSTRIA-HUNGARY.

SLED.

1,007,361. Specification of Letters Patent. Patented Oct. 31, 1911.

Application filed October 5, 1910. Serial No. 585,429.

*To all whom it may concern:*

Be it known that I, WILHELM KNŸ, a subject of the Emperor of Austria-Hungary, and residing at 35 Kaiser Franz Josef-strasse, Bodenbach - on - the - Elbe, Austria-Hungary, have invented certain new and useful Improvements in Sleds; and I do hereby declare the following to be a full, clear, and exact description of the same.

This invention relates to sleds and has for object a guidable sled, the steering of which in a curve can be effected without the rider having to displace his center of gravity and in which the hitherto customary pressing of the feet against the track, which stops the running, is obviated and injuries to the feet caused by the above practice or by overtaking sleds are rendered impossible.

The invention consists in an improved sled having two steering shoes adapted to receive the feet of the rider and capable of swinging longitudinally to the frame of the sled, which guiding shoes can be tilted independently of each other by the feet of the rider so as to engage with the track, whereby the sled can be guided around curves without lateral displacement of the center of gravity of the rider.

The invention also consists in arranging the guiding shoes inside the runner of the sled for the purpose of preventing injury to the feet of the rider by other overtaking sleds and similar causes.

In order that the sled may be enabled to travel along a flat or gently rising track, ice slide or the like hand levers are arranged to be moved backward and forward by the rider, on which are arranged above their fulcrums striking rods, which on backward movement of the hand lever are struck down into the snow or ice in such a manner that the sled is moved forward.

To steer the sled in curves the left hand striking rods are lifted up when turning to the left and the right hand ones when turning to the right while the other rods by backward motion of the hand lever are struck into the track, the result being that the sled turns around to the side whose striking rods have been actuated and this motion can be assisted by pulling on the raised striking rods. In order to prevent the backward running of the sled when traveling along an ascending track spurs are jointed to downward extensions of the hand lever situated above the fulcrum, which spurs are pressed into the track by means of springs.

Figure 1:
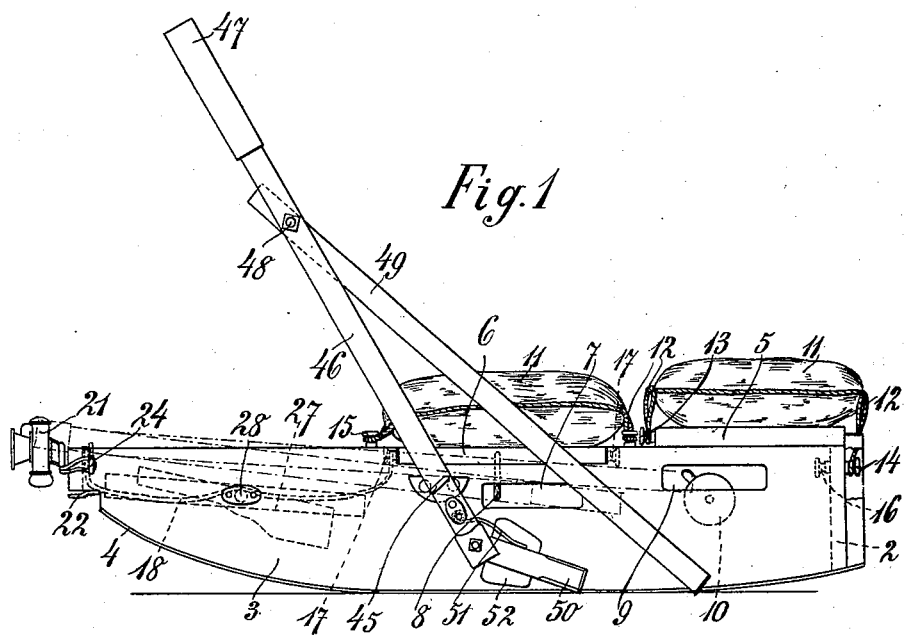
Figure 2:
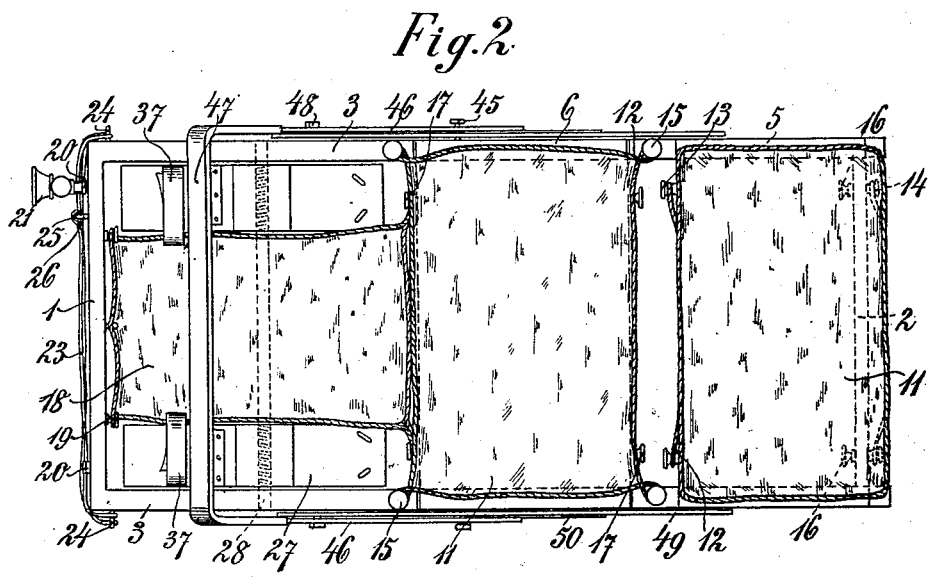

The invention will now be described with references to the accompanying drawings which illustrate one constructional form, and in which, Figure 1 is a side elevation of the improved sled. Fig. 2 is a plan thereof. Fig. 3 illustrates to larger scale a guiding shoe in elevation with a section through the steering share. Fig. 4 is a view from the back of a steering share. Figs. 5 and 6 show a back view and an elevation of a second type of steering share. Figs. 7 and 8 are a section and plan of a third form of steering share. Fig. 9 is a plan of the center portion of a steering shoe. Fig. 10 is an elevation showing the mounting of the steering shoe and the situation of the seating cushions when the sled is being carried on the shoulders.

The sled contains the two runners 3 of suitable material connected at their ends by means of strong cross bars 1 and 2, the runners being made preferably of hard wood boards and their upwardly curved running edges provided with metal facings 4. At the back end of the runner 3 a fixed seat 5 is arranged, in front of this a movable seat 6 for a second person is placed the latter being fitted in corresponding grooves in the runners and fixed by means of suitable fastenings 8 inserted through the front slots 7 in the runners 3. The slots 7 and 9 in the sides of the runners serve as hand grips for the riders. On one of the runners 3 and inside thereof close to the slot 9 a bell 10 is arranged with which the rider can give warning signals. On the seats 5 and 6 suitable cushions 11 may be placed and held down by loops or strings 12, which are on the back cushion fastened around the buttons 13 and 14 and on the front cushion around the buttons 15 fixed to the runners. When carrying the sled the cushions 11 are fixed underneath the seats, for which purpose the loops or strings of the back cushion are fastened around the buttons 13 and 16 and those of the front cushion around the buttons 17 of the front seat.

To protect the clothes of the rider, when both seats are being used, a cover 18 is fixed lengthwise by means of string loops fastened around the front buttons 17 of the seat 6, and at the other end around the buttons 19 on the cross beam 1. When the front seat 6 is removed this protecting cover 18 is arranged across the sled at right angles and fastened to the buttons 15.

A hook 20 is arranged on the cross bar 1 for the reception of a lamp 21 while in motion and at the front end of the runner 3 a hook 22 for the lamp 21 when the sled is being carried on the shoulders.

For pulling along the sled a string 23 is provided which is fixed in eyes 24 on the runner 3 by means of snap hooks. Normally however only one end of the string is fixed to an eye 24, while the hook 25 of the other end of the string is hooked into an eye 26 on the cross bar 1 after the string has been looped around the eyes 24.

In front of the seats 5 and 6 and inside the runners 3 are two steering runners 27 adapted to be actuated by the feet of the rider sitting on the back seat 5, and capable of tilting about the axis 28. Each steering runner 27 consists of a wooden pedal bar 29 the sides of which are embraced by a metal stirrup 30 whose cross member is arranged to lie below the bar 29. The stirrup 30 can rotate freely on the axle 28, but the pedal bar 29 rotates on a screw thread on the axis 28 in order to prevent inward displacement of the guiding shoe. The wooden bar 29 and the metal stirrup 30 are generally held together by a screwed pin 31, after screwing out which the bar and the stirrup can be twisted oppositely to each other. On the bar 29 a small block 32 is arranged for the shoe cavity, and behind this an eyelet screw 33 or a projecting member for the back surface of the heel of the shoe, for the purpose of preventing slipping of the foot in the steering shoe. In front of the block 32 on the bar 29 a bolt 34 is mounted in a recess for which bolt two sockets 35 and 36 are provided in order that the steering shoe may be fixed to the runners. The sockets 36 are used when the sled is being carried on the shoulders in which case the sled rests on the shoulders with the steering shoes or the underside of the pedal bars 29 which lie straight across the runners.

In front of the bolt 34 is arranged the foot strap 37 which is attached at one end to a side of the pedal bar 29 from which the strap passes to the opposite side of the metal stirrup 30 going outward and above the latter and then below it and inward in such a manner that one of the adjustment holes 38 can be fastened to a button 39 in the bar 29. In this manner the objectionable strap buckle which presses on the foot is eliminated. The foot strap is preferably made of stiff leather to prevent falling in of the foot rest.

The metal stirrup 30 is provided with the blades or shares which cut into the snow. The latter can as in Figs. 7 and 8, be formed directly on the stirrup 30 by sharpening the lower edge of its arc shaped cross member or may consist of movable blades.

According to Figs. 3 and 4 a share 40 is fitted between the side arms of the stirrup 30 and is turned around by the bar 29 in such a manner that its downwardly bent edge 41 surrounds the outside of the stirrup cross bar. When the stirrup 30 and the bar 29 are connected by means of the screw pin 31 the upper edge of the share 40 comes against the bottom side of the bar 29 preferably in a cross groove in the same, whereby the share 40 is firmly fastened in the stirrup 30, but may yet be easily removed or changed. The latter type of share are especially suitable for sliding on tracks having much ice, but on the other hand for sliding over snow surfaces the arrangement of longitudinal shares shown in Figs. 5 and 6 is to be recommended, as this type greatly protect the track. Two double edged blades 42 are fitted into a metal stirrup 30 in such a manner that each of them embraces the corresponding side arm with two angularly bent projections 43, and embraces the cross bar of the stirrup 30 above and below by means of a recess 44. The wooden bar 29 is recessed at its lower end by the thickness of the share 42 to create two shoulders which prevent forward displacement of the said share. As soon as the lower edges of the share 42 become blunt the share can be removed from the stirrup 30 turned through 180° so that the sharp upper blade points downward and each share then placed in the other stirrup. If desired both the longitudinal share 42 and the exchangeable lateral share 40 can be used.

In steering the hereinbefore described sled around curves, the rider does not require to shift the center of gravity by moving his body but can retain the upright position. The steering is effected by tilting with the feet the corresponding guiding shoe 27 backward and downward so that its blades or shares cut into the snow surface and thus retard the progress of the corresponding runner, the other runner sliding on unhindered whereby the sled turns in toward the retarded side and thus describes a curve.

For moving the sled along the level and gently ascending tracks the following device is used. Outside the runners 3 two oscillating levers 46 are pivotally mounted on pins 45 screwed into corresponding nuts and having butterfly heads, these oscillating levers being connected at their tops by a cross member 47 as shown in Figs. 1 and 2. On the inside of these levers 46 backwardly extending striking rods 49 are jointed by means of bolts 48 which rods when the levers 46 are pulled back engage in ice or snow with their sharpened ends. This engagement on the track will be assisted if the bars 49 have a certain amount of play on the bolts 48 or these bolts in the levers 46. To propel the sled forward the rider pulls the oscillating levers 46 backward, whereupon the rods 49 are thrust backward into the snow or ice so as to make a point of support for the oscillating lever 46 which effects the propulsion. When the levers 46 are pushed forward the rods 49 slide loosely over the track. For propelling the sled around a curve the corresponding supporting rod 49 is raised while the other engages with the ground so that the sled turns in toward the side of the raised up rod, and by pulling at the same the turning of the sled can be assisted.

To prevent the sled from slipping backward on an ascending track during the time that the oscillating levers 46 and striking rods 49 are being moved forward, spurs 50 are jointed to extensions of the oscillating levers 46 above the fulcrum 45 thereof which spurs are pressed into the snow by springs 51. These spurs 50 are sharpened and provided with projecting blades 52. The sharpening and the blades 52 are provided on both sides of the spurs 50 so that when the lower edges become blunt they can be replaced by the upper ones. For this purpose the oscillating lever 46, 47 is removed from the frame of the sled by unscrewing its bolt pivot 45, the supporting rods 49 and the spurs 50 are turned about their pivot pins to the other side of the lever 46, the springs 51 taken out and displaced through 180° and again fixed to the lever 46 and lastly the oscillating stirrup likewise turned through 180° again mounted on the sled frame by screwing the bolt 45.

When not in use the above propelling device lies along the runners with the cross bar 47 in front of the bar 1 on the eyes 24 this position of the device being secured by means of friction devices or the like.

Having now described my invention what I claim as new and desire to secure by Letters Patent is:—

1. In a sled, longitudinally independently swinging steering shoes arranged inside the runners and consisting of a pedal bar for the feet of the rider and a stirrup member whose side arms embrace the pedal bar and whose cross bar lies beneath the pedal bar, the stirrup member carrying the steering share which engages with the track.

2. In a sled, longitudinally, independently swinging steering shoes arranged inside the runners, consisting of a pedal bar for the feet of the rider and a stirrup member carrying the steering share engaging with the track, the side arms of the stirrup member embracing the pedal bar and the cross bar lying beneath the same and removable therefrom to allow the share to be inserted.

3. In a sled, longitudinally, independently swinging steering shoes arranged inside the runners and consisting of a pedal bar for the feet of the rider and a stirrup member whose side arms embrace the pedal bar and whose cross bar lies beneath the pedal bar, the stirrup member carrying a steering share lying against the inner surface of the stirrup cross bar and with its upper edge bent over backward to embrace the said cross bar, the top of the share being supported against the under edge of the pedal bar.

4. In a sled, longitudinally, independently swinging steering shoes arranged inside the runners and consisting of a pedal bar for the feet of the rider and a stirrup member whose side arms embrace the pedal bar and whose cross bar lies beneath the pedal bar, the stirrup member carrying two shares lying against the inner surface of the side arms of the stirrup and embracing the said side arm with angularly bent projections and the cross bar above and below by means of a recess in its back edge, shoulders being formed in the pedal bar to support the front edges of the shares.

5. In a sled, longitudinally, independently swinging steering shoes arranged inside the runners and operated by the feet of the rider to engage with the track, and means for locking each shoe in a position along or across the runners.

6. In a sled, longitudinally, independently swinging steering shoes arranged inside the runners and consisting of a pedal bar for the feet of the rider and a stirrup member whose side arms embrace the pedal bar and whose cross bar lies beneath the pedal bar, the stirrup member carrying the steering share which engages with the track and adjustable foot straps attached to the pedal bar.

In testimony whereof, I have signed my name to this specification in the presence of two subscribing witnesses.

WILHELM KNÝ.

Witnesses:
PAUL ARRAS,
CLÄRE SIMON.